United States Patent
Xu et al.

(10) Patent No.: US 10,671,181 B2
(45) Date of Patent: Jun. 2, 2020

(54) TEXT ENTRY INTERFACE

(71) Applicant: Microsoft Technology Licensing, LLC, Redmond, WA (US)

(72) Inventors: Yaming Xu, Tokyo (JP); Kyohei Tomita, Tokyo (JP)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 240 days.

(21) Appl. No.: 15/477,290

(22) Filed: Apr. 3, 2017

(65) Prior Publication Data

US 2018/0285335 A1    Oct. 4, 2018

(51) Int. Cl.
*G06F 3/048* (2013.01)
*G06F 3/023* (2006.01)
(Continued)

(52) U.S. Cl.
CPC .......... *G06F 3/0237* (2013.01); *G06F 3/017* (2013.01); *G06F 3/0233* (2013.01);
(Continued)

(58) Field of Classification Search
CPC .... G06F 3/0233; G06F 17/276; G06F 3/0237; G06F 3/0482; G06F 3/017; G06F 3/0219;
(Continued)

(56) References Cited

U.S. PATENT DOCUMENTS

| 5,574,482 A * | 11/1996 | Niemeier | ............ | G06F 3/04886 345/168 |
| 5,963,671 A * | 10/1999 | Comerford | ........... | G06F 3/0237 382/230 |

(Continued)

FOREIGN PATENT DOCUMENTS

| EP | 2612263 A1 | 7/2013 |
| WO | 2010147611 A1 | 12/2010 |
| WO | 2015127325 A1 | 8/2015 |

OTHER PUBLICATIONS

"International Search Report and Written Opinion Issued in PCT Application No. PCT/US2018/024690", dated Jun. 8, 2014, 11 Pages.

*Primary Examiner* — Ajay M Bhatia
*Assistant Examiner* — Jennifer E Nichols
(74) *Attorney, Agent, or Firm* — Workman Nydegger

(57) ABSTRACT

Receiving user input. A method includes displaying a set of characters arranged sequentially in a curvilinear or linear fashion such that any one of the characters in the set of characters can be identified for selection by continuous and uniform user input from a user. The method further comprises displaying a plurality of the characters in the set of characters in a fashion where each given character in the plurality of characters is displayed at a level of prominence determined by a probability that the given character is a next character in a string of characters selected by a user. The method further includes receiving user input in a continuous and uniform fashion from a user to identify a character in the set of characters. The method further includes receiving user input selecting the identified character. The method further includes adding the identified character to the string of characters.

20 Claims, 7 Drawing Sheets

(51) Int. Cl.
*G06F 3/0488* (2013.01)
*G06F 3/0482* (2013.01)
*G06F 40/274* (2020.01)
*G06F 3/01* (2006.01)
*G06F 3/0484* (2013.01)
*G06F 40/174* (2020.01)
*G06F 3/033* (2013.01)
*G06F 3/02* (2006.01)
*G06F 1/16* (2006.01)

(52) U.S. Cl.
CPC .......... *G06F 3/0236* (2013.01); *G06F 3/0482* (2013.01); *G06F 3/04842* (2013.01); *G06F 3/04886* (2013.01); *G06F 40/274* (2020.01); *G06F 1/1662* (2013.01); *G06F 3/013* (2013.01); *G06F 3/0219* (2013.01); *G06F 3/033* (2013.01); *G06F 3/04883* (2013.01); *G06F 40/174* (2020.01)

(58) Field of Classification Search
CPC .... G06F 3/033; G06F 1/1611; G06F 3/04883; G06F 3/04842; G06F 1/1662; G06F 1/0233; G06F 3/0236
See application file for complete search history.

(56) References Cited

U.S. PATENT DOCUMENTS

| | | | | |
|---|---|---|---|---|
| 6,011,542 A * | 1/2000 | Durrani | G06F 3/0236 | 345/156 |
| 6,600,480 B2 | 7/2003 | Natoli | | |
| 6,621,424 B1 * | 9/2003 | Brand | G06F 3/0237 | 341/22 |
| 6,956,559 B2 * | 10/2005 | Hagiwara | A63F 13/06 | 345/156 |
| 7,973,770 B2 * | 7/2011 | Tokkonen | G06F 3/0236 | 345/173 |
| 8,188,980 B2 * | 5/2012 | Kwon | G06F 3/0236 | 345/156 |
| 8,223,127 B2 * | 7/2012 | Park | G06F 3/0481 | 345/156 |
| 8,237,593 B2 * | 8/2012 | Oh | G06F 1/1626 | 200/5 A |
| 8,429,692 B2 * | 4/2013 | Zeldis | H04N 5/44543 | 725/53 |
| 8,667,413 B2 * | 3/2014 | Cheng | G06F 3/04892 | 345/160 |
| 8,766,918 B2 * | 7/2014 | Aliakseyeu | G06F 3/0237 | 345/167 |
| 8,918,408 B2 | 12/2014 | Ohtsuki et al. | | |
| 8,947,355 B1 * | 2/2015 | Karakotsios | G06F 3/017 | 345/158 |
| 9,063,580 B2 * | 6/2015 | Hunleth | G06F 3/0236 | |
| 9,244,905 B2 | 1/2016 | Joshi et al. | | |
| 9,292,082 B1 * | 3/2016 | Patel | G02B 27/017 | |
| 9,348,503 B2 * | 5/2016 | Kajiyama | G06F 3/018 | |
| 9,448,725 B2 * | 9/2016 | Amsterdam | G06F 3/0219 | |
| 2002/0122031 A1 * | 9/2002 | Maglio | G06F 3/0233 | 345/184 |
| 2003/0197740 A1 * | 10/2003 | Reponen | G06F 3/0362 | 715/810 |
| 2004/0070567 A1 * | 4/2004 | Longe | G06F 3/02 | 345/156 |
| 2004/0104896 A1 * | 6/2004 | Suraqui | G06F 3/0237 | 345/168 |
| 2005/0041011 A1 | 2/2005 | Silfverberg et al. | | |
| 2005/0187754 A1 * | 8/2005 | Suess | G06F 3/023 | 704/4 |
| 2005/0210402 A1 * | 9/2005 | Gunn | G06F 3/0236 | 715/773 |
| 2005/0240879 A1 * | 10/2005 | Law | G06F 1/1613 | 715/773 |
| 2006/0088357 A1 * | 4/2006 | Wedding | G06F 3/0219 | 400/489 |
| 2006/0095844 A1 * | 5/2006 | Van Leeuwen | G06F 3/0236 | 715/700 |
| 2006/0119582 A1 * | 6/2006 | Ng | G06F 3/04883 | 345/168 |
| 2006/0228149 A1 * | 10/2006 | Harley | G06F 3/04886 | 400/486 |
| 2006/0242557 A1 * | 10/2006 | Nortis, III | G06F 40/177 | 715/234 |
| 2007/0245259 A1 * | 10/2007 | Carlson | G06F 3/0236 | 715/773 |
| 2007/0296704 A1 * | 12/2007 | Park | G06F 3/0362 | 345/169 |
| 2008/0084417 A1 * | 4/2008 | Sawaki | G01C 21/3611 | 345/467 |
| 2008/0222571 A1 * | 9/2008 | Yoshioka | A63F 13/06 | 715/841 |
| 2009/0048020 A1 * | 2/2009 | Gruen | A63F 13/10 | 463/37 |
| 2009/0125296 A1 * | 5/2009 | Imlach | G06F 3/0237 | 704/9 |
| 2009/0327963 A1 * | 12/2009 | Mouilleseaux | G06F 3/0482 | 715/834 |
| 2009/0327964 A1 * | 12/2009 | Mouilleseaux | G06F 3/0482 | 715/834 |
| 2010/0013772 A1 * | 1/2010 | Jung | G06F 3/0416 | 345/166 |
| 2010/0141609 A1 * | 6/2010 | Frisbee | G06F 3/0234 | 345/184 |
| 2010/0169832 A1 * | 7/2010 | Chang | G06F 16/954 | 715/811 |
| 2010/0266323 A1 | 10/2010 | Min | | |
| 2010/0289750 A1 * | 11/2010 | Kim | G06F 3/018 | 345/173 |
| 2011/0037775 A1 * | 2/2011 | Park | G06F 3/0233 | 345/592 |
| 2011/0078613 A1 * | 3/2011 | Bangalore | G06F 3/04886 | 715/773 |
| 2011/0099506 A1 * | 4/2011 | Gargi | G06F 3/0237 | 715/773 |
| 2011/0119623 A1 * | 5/2011 | Kim | G06F 3/0237 | 715/808 |
| 2012/0036434 A1 * | 2/2012 | Oberstein | G06F 3/0482 | 715/702 |
| 2012/0262311 A1 * | 10/2012 | Weller | G06F 3/0219 | 341/22 |
| 2013/0104079 A1 * | 4/2013 | Yasui | G06F 3/0482 | 715/834 |
| 2013/0205242 A1 * | 8/2013 | Colby | G06F 3/0482 | 715/773 |
| 2013/0275917 A1 * | 10/2013 | Norris, III | G06F 40/14 | 715/841 |
| 2014/0015753 A1 * | 1/2014 | Pai | G06F 3/04883 | 345/168 |
| 2014/0059482 A1 * | 2/2014 | Won | G06F 3/04855 | 715/787 |
| 2014/0078065 A1 | 3/2014 | Akkok | | |
| 2014/0237356 A1 * | 8/2014 | Durga | G06F 3/0237 | 715/256 |
| 2014/0250405 A1 * | 9/2014 | Wheeler | G06F 40/274 | 715/780 |
| 2014/0380223 A1 * | 12/2014 | Counsell | G06F 3/017 | 715/773 |
| 2015/0355727 A1 * | 12/2015 | Hu | G06F 3/04886 | 345/169 |
| 2016/0034181 A1 * | 2/2016 | Norris, III | G06F 3/04897 | 715/773 |
| 2016/0063767 A1 | 3/2016 | Lee et al. | | |
| 2016/0092428 A1 | 3/2016 | Ilic et al. | | |
| 2016/0253050 A1 | 9/2016 | Mishra et al. | | |
| 2016/0364132 A1 * | 12/2016 | Stein | G06F 3/0236 | |
| 2018/0253208 A1 * | 9/2018 | Fu | G06F 3/04886 | |

* cited by examiner

TEXT ENTRY INTERFACE

BACKGROUND

Background and Relevant Art

Computers and computing systems have affected nearly every aspect of modern living. Computers are generally involved in work, recreation, healthcare, transportation, entertainment, household management, etc.

Many computers are intended to be used by direct user interaction with the computer. As such, computers have input hardware and software user interfaces to facilitate user interaction. For example, a modern general-purpose computer may include a keyboard, mouse, touchpad, camera, etc. for allowing a user to input data into the computer.

Text entry via virtual/on-screen QWERTY keyboards is cumbersome on gaming consoles using game controllers and the emerging virtually reality (VR), augmented reality (AR), and mixed reality (MR) platforms. The QWERTY layout was designed and optimized for a two-handed, 10 finger input. However, it is inefficient and unnatural for the gaming, VR, AR, MR, and other input modalities (e.g., gamepad interaction, gaze, hand gestures, etc.). These modalities, by nature, are less efficient compared with simultaneous ten-fingers input. They are used to sequentially navigate a cursor or other indicator to desired characters on the QWERTY layout from character to character.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of receiving user input. The method includes displaying a set of characters arranged sequentially in a curvilinear or linear fashion such that any one of the characters in the set of characters can be identified for selection by substantially continuous and uniform user input from a user. The method further comprises displaying a plurality of the characters in the set of characters in a fashion where each given character in the plurality of characters is displayed at a level of prominence determined by a probability that the given character is a next character in a string of characters selected by a user. The method further includes receiving user input in a substantially continuous and uniform fashion from a user to identify a character in the set of characters. The method further includes receiving user input selecting the identified character. The method further includes adding the identified character to the string of characters.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments illustrated herein implement a dial or other sequentially arranged character input user interface. Additionally, in some embodiments, the sequentially arranged character input provides a dynamic interface optimized based on one or more language models. For example, embodiments can dynamically adjust the sequentially arranged character input based on language predictions.

A user can indicate and subsequently commit to characters using a substantially sustained and uniform user input due to the sequential nature of the user interface. For example, a user could navigate to indicate a character using a dialing motion. This is a natural and simple motion for a gamepad thumbstick, gaze control on a facial sensing system, repetitive motion gesture control on a gesture sensing system, etc.

Figure 1A:
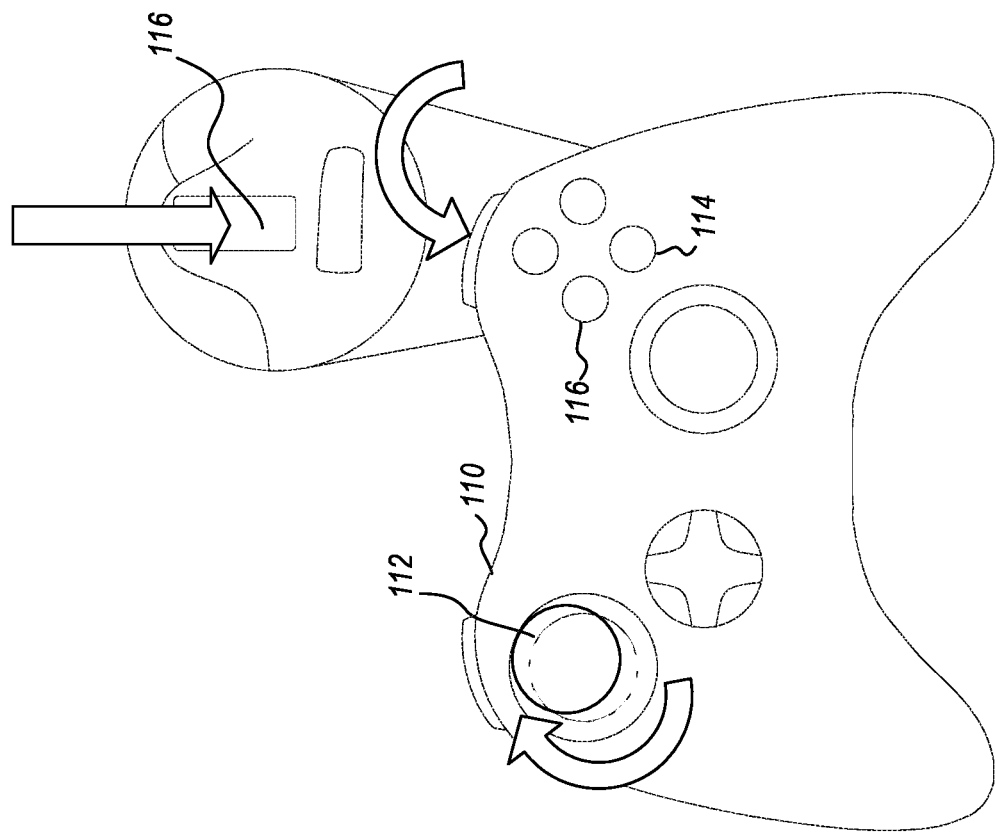
FIG. 1A illustrates a controller and a user interface including various input layers for inputting text, at a first time.
Figure 1A:
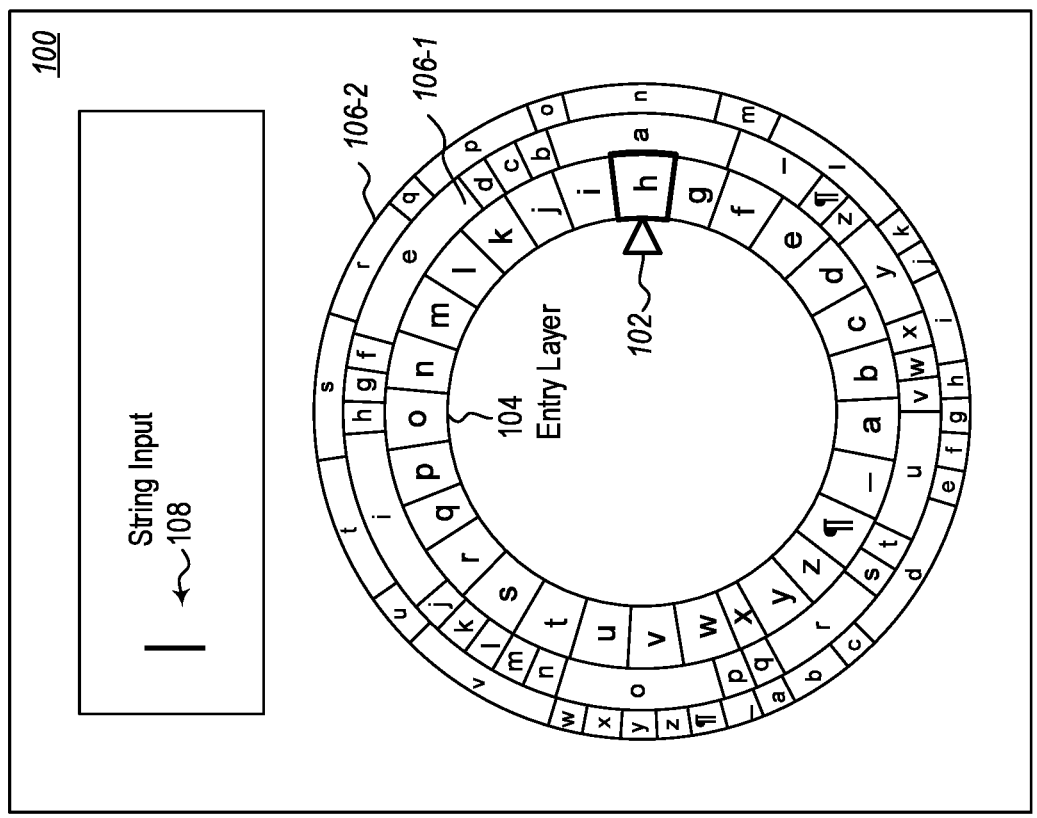

Referring now to FIG. 1A, an example is illustrated. FIG. 1A illustrates a user interface 100. The user interface 100 illustrated in FIG. 1A is illustrated with three parts: a dialing cursor 102, an entry layer 104, and predictive layers 106-1 and 106-2. FIG. 1A further illustrates that the user interface 100 includes a string input 108.

Referring now to FIG. 1A, details regarding the dialing cursor 102 are illustrated. In the example illustrated in FIG. 1A, a dialing cursor 102 or other indicator is located within the most inner ring (i.e., the entry layer 104) and proximate the entry layer 104. In some embodiments, the dialing cursor 102 can be in contact with the entry layer 104. While a pointer shape is shown for the dialing cursor 102 in the example illustrated in FIG. 1A, it should be appreciated that virtually any shape may be used for the dialing cursor 102.

As will be illustrated in more detail below, the dialing cursor 102 can be navigated to a character displayed in the entry layer 102 to indicate the character in the entry layer 102. The indicated character can then be selected by some mechanism, such as a button click, trigger pull, hand gesture, eye gesture, or other input as will be illustrated in more detail below.

Note that while in the present example, a dialing cursor 102 is illustrated for indicating a character, it should be appreciated that characters can be, alternatively or additionally, indicated in other fashions. For example, in some embodiments, the entry layer 104 may be translocated such that characters in the entry layer are indicated based on being in a certain position and/or location in the user interface 100. For example, using the circular entry layer 104, a character at the 0° position of the circle is the character indicated. Alternatively or additionally, a character may be displayed with a user interface element that is outlined, shaded, shadowed, popped out, popped in, colored, or otherwise distinguished from user interface elements for other characters in the entry layer 104.

FIG. 1A further illustrates an entry layer 104. In the example illustrated in FIG. 1A, the inner-most ring is the entry layer 104. A character set (e.g. Latin alphabet, Japanese Hiragana, etc.) can be arranged on or about the entry layer 104. In some embodiments, the character set is arranged sequentially. For example, the character set may be arranged in alphabetical order. When using a circular entry layer such as illustrated in FIG. 1A, the characters in the character set may be arranged sequentially either counter-clock-wisely or clock-wisely). As will be discussed in more detail below, a circular or elliptical pattern is not necessary for the user interface. For example, in some embodiments, the interface may use a rectangular, linear, curvilinear or other shape. In these cases, some embodiments may order the character set sequentially in a left to right, right to left, or other appropriate sequential fashion. Additionally, while some embodiments are illustrated with the characters in the set of characters in a sequential fashion, other embodiments may order the characters in other intuitive fashions. For example, in some embodiments, vowels may be grouped together at the entry layer 104. Additionally or alternatively, commonly used characters may be grouped together. Alternatively or additionally, seldom used characters may be grouped together. Alternatively or additionally, in pictographic character representations, characters with similar meanings may be grouped together at the entry layer 104.

In some embodiments, a color mapping (e.g., a spectral mapping from shades of red through shades of yellow through shades of green) is applied to the entry layer 104 to assist users in quickly locating a desired character. For example, a user may learn to recognize that characters at the beginning of an alphabet are closer to red in the spectrum while characters near the end of an alphabet represented at the entry layer 104 are more proximate green coloring in the spectrum represented on the entry layer 104.

Figure 1B:
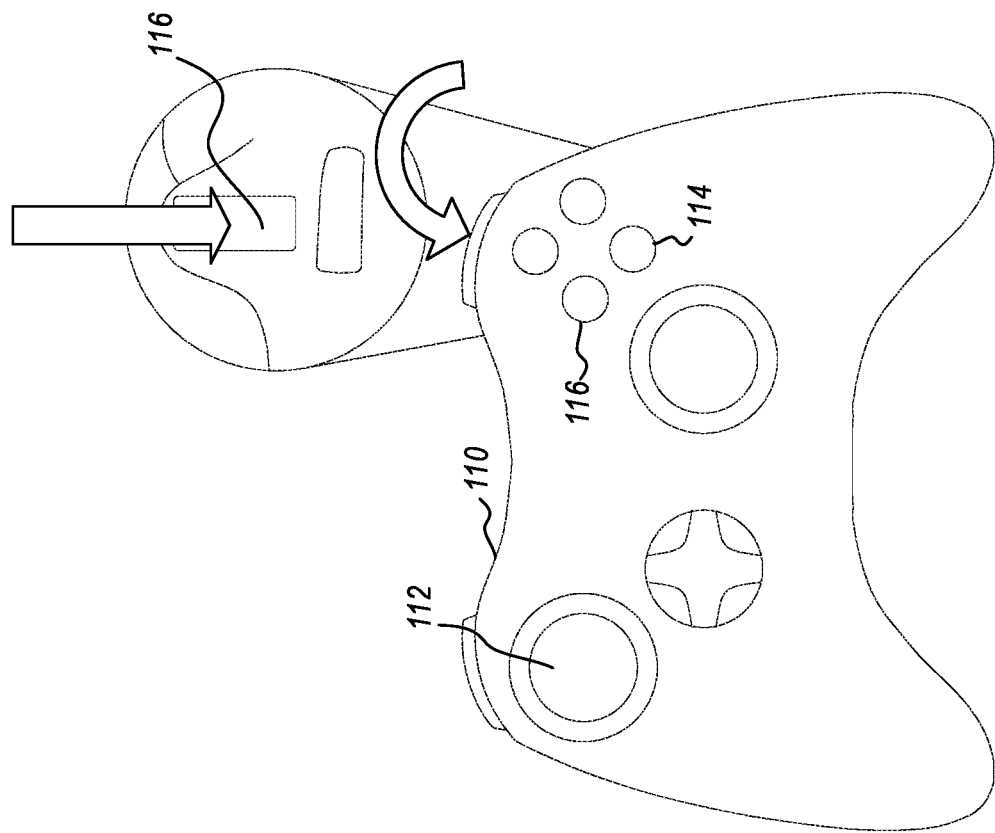
FIG. 1B illustrates the controller and user interface at a second time.
Figure 1B:
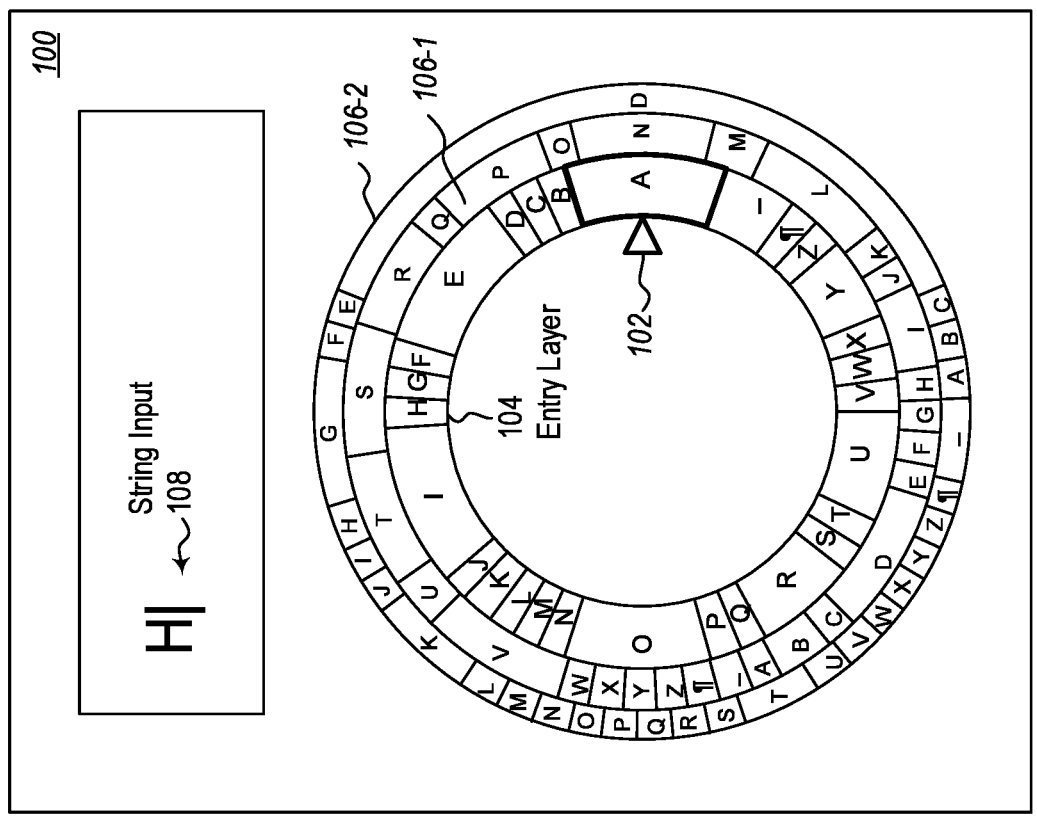

The prominence with which a given character is displayed at the entry level 104 is determined and/or displayed according to the conditional probability of the character, given text input history. For example, in some embodiments, the prominence of a character may be linearly (or in some cases exponentially, or otherwise) proportional to the conditional probability of the character given text input history. For instance, in FIG. 1B, the character 'A' is very likely be input next after users have typed 'H'. Therefore, the arc length for 'A' is relatively long as compared to the arc length of some other characters at the entry level 104 as shown in FIG. 1B. Note in FIG. 1B that 'I' and 'O' also have relatively long arc lengths as they also have higher probability of being included in the string input 108 based on the previous entry of the letter 'H'. Determining and/or displaying characters with a prominence according to the conditional probability of the character given text input history makes characters with larger entry likelihoods easier to be indicated by the cursor (or other indicator mechanism) to be input into the string input 108. The character probabilities can be obtained from a well-trained language model. For example, embodiments may use one or more of a simple n-gram language model, relatively sophisticated PPM (prediction by partial matching) language model, advanced RNN (recurrent neural network) language model, or other appropriate model.

Also note that in some embodiments, a minimum prominence, such as in the present example, a minimum arc length, may be implemented to prevent characters from being represented with a prominence that is not sufficiently prominent according to some predetermined criteria. For example, arcs or other prominence shapes may be displayed with sufficient size so as to be able to display characters at some minimum font size without significantly impacting or obfuscating the character representation. For example, some embodiments may be implemented to display some percentage of a character or some significant portions of the character to allow a user to be able to determine the character. In alternative embodiments, although the character may not be recognizable in the entry layer 104, the character will still be displayed with sufficient prominence that it can be navigated to and selected by a user without undue difficulty. For example, the character may be displayed with a prominence having a minimum pixel number or some other measure that allows the character to be navigated to and distinguished in location from other characters by at least some predetermined threshold.

FIG. 1A also illustrates predictive layers 106-1 and 106-2. Predictive layers 106-1 and 106-2, in the illustrated example, are the middle and the outer-most rings depicted. The number of the predictive layers is not limited to two, as shown in the illustrated example, but can be any reasonable number. In some embodiments, the number of layers may be user customizable up to a predetermined threshold. In other embodiments, a fixed number of layers is provided to the user.

In the illustrated example, the character ordering and color mapping in the predictive layers (referred to generally as 106) is the same as the entry ring 104.

In the predictive layers 106, in some embodiments, prominence of a given character (e.g., the arc length for a given character in the illustrated example) is determined and displayed based on (e.g., proportional to) the conditional probability given of both text input history and also one or more characters indicated by the user interface (e.g., characters located on all inner rings pointed to by the cursor (within cursor's radar) or in a position (such as 0°) to indicate a character) in various layers. Determining and displaying character prominence may also be based on the order of indicated characters. For example, in FIG. 1B, the prominence of the character 'N' in the predictive layer 106-1 is based on predictive models that take into account the fact the 'H' has already been entered and that the cursor 102 is pointing to the letter 'A' in the entry layer 104. Additionally, the prominence of the letter 'D' in the predictive layer 106-2 is based on the fact that 'H' has already been selected, 'A' in the entry layer 104 is pointed to by the cursor 104 and 'N' is pointed to by the cursor 104 in the predictive layer 106-1.

In some embodiments, predictive layers 106 are moved along with character indication in the entry layer so that the most prominently displayed characters in a predictive layer are indicated allowing for selection. For example, in the illustrated example, circular predictive layers 106 are rotated along with cursor movement (such as cursor dialing as illustrated in the present example) so that, for the predictive layers 106, the longest arcs' center points are always pointed to by the cursor 104. This helps users rapidly select characters without the need for additional indication. For example, in the illustrated example, a user will not need to perform additional cursor dialing once the top predicted characters are the desired ones. For example, consider the example illustrated in FIGS. 1C and 1D. In this example, a user quickly inputs characters by selecting twice in a row in rapid succession. Rapid may be defined according to some predetermined threshold defining a period of selection. Selecting is illustrated in more detail below.

Cursor and/or layer movement may be performed by performing sustained and uniform user input. In particular, the input can be sustained for an amount of time and in a uniform fashion (e.g., in a fashion having similar motion(s) throughout the movement) sufficient to indicate a character. For example in the examples illustrated herein, a dialing motion can be used to rotate the cursor 102 along the entry layer 104 until a particular character is indicated. For example, the rotating can be driven by thumbstick on a gamepad, gaze for a VR, AR, or MR system, a hand gesture for a motion detection system, a thumb gesture on a screen, or any other suitable input. In some embodiments, a rotating motion can be applied to a user input device. For example, a thumbstick can be moved in a rotating motion. For example, reference is now made to FIG. 1A which illustrates a controller 110. The controller 110 includes a thumbstick 112. As illustrated in FIG. 1A, the thumbstick 112 can be rotated to move the cursor 102 for character indication.

Alternatively or additionally, a gaze can be performed by rotating eye movement. A hand gesture can have a substantially curved motion. In this way, users can point the cursor to their desired characters via dialing the cursor.

Note however that in other embodiments, the entry layer 104 may be moved. In some such embodiments, a cursor is not used. For example, as noted above, the entry layer may be moved in a context where some location on the screen represents a character indication location. In this example, gestures or other input may be performed to move the entry layer 104 such that a character in the entry layer 104 is at the character indication location. A character at the character indication location can be selected by the user for addition to the string input 108. In some embodiments, the character indication location may be a grid location on a screen. In an alternative embodiment, the character indication location may be an orientation. For example, in the illustrated example, if elliptical (including circular) entry layers are used, the character at the top of the ellipse (i.e., rotated to approximately 0°, is in the character indication location.

Note also that while elliptical layers are illustrated herein, it should be appreciated that other types of layers could be implemented. For example, in some embodiments, the layers may simply be straight lines, curvilinear shapes, and the like. Alternatively rectangular layers, triangular layers, or other polygonally shaped layers may be used.

The following now illustrates details with respect to character selection. An identified character can be selected for addition to the string input 108 by one or more various selection signals. For example, a user may select button A 114, a trigger 116, depress the thumbstick 112, or select other button on a controller. A user may perform an 'OK' hand gesture on a VR, AR, or MR system. Thus, for example, a character on an entry layer 104 pointed by the cursor 102 (or in an identification location) may be selected for entry into a string of characters. Selecting a character will cause layer replacement. For example, the entry layer 104 may be replaced by a predictive layer 106 (often an adjacent predictive layer, i.e., layer 106-1 in the illustrated example) and predictive layers may be replaced by other predictive layers, or by newly generated predictive layers. Thus, in the illustrated example, a single character selection will cause each layer will be replaced by their most-close-outer layer. Thus, the most-inner layer will be the new entry layer, and a new most-outer layer will be generated following a selected predicted layer logic.

Figure 1C:
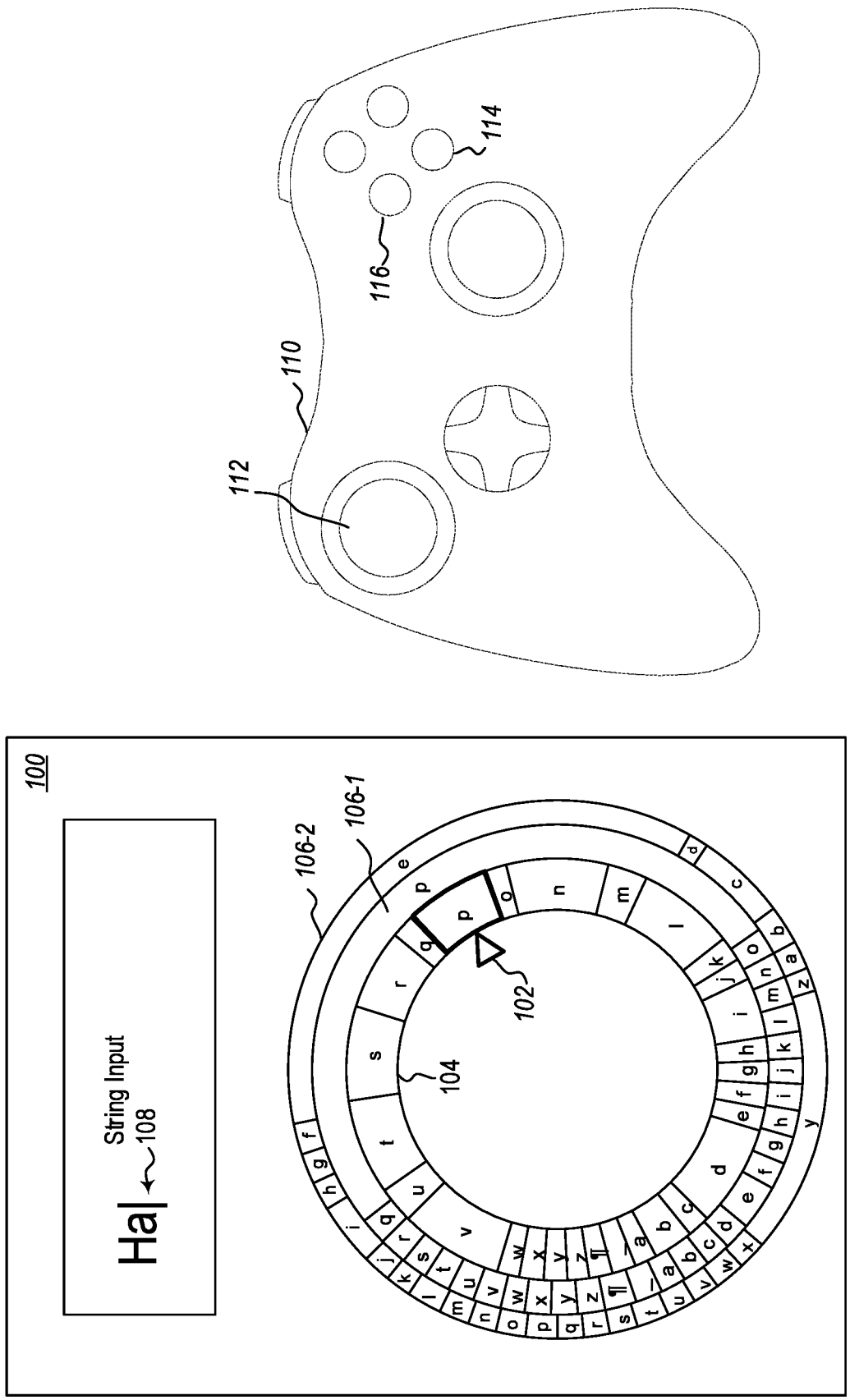
FIG. 1C illustrates the controller and user interface at a third time.
Figure 1D:
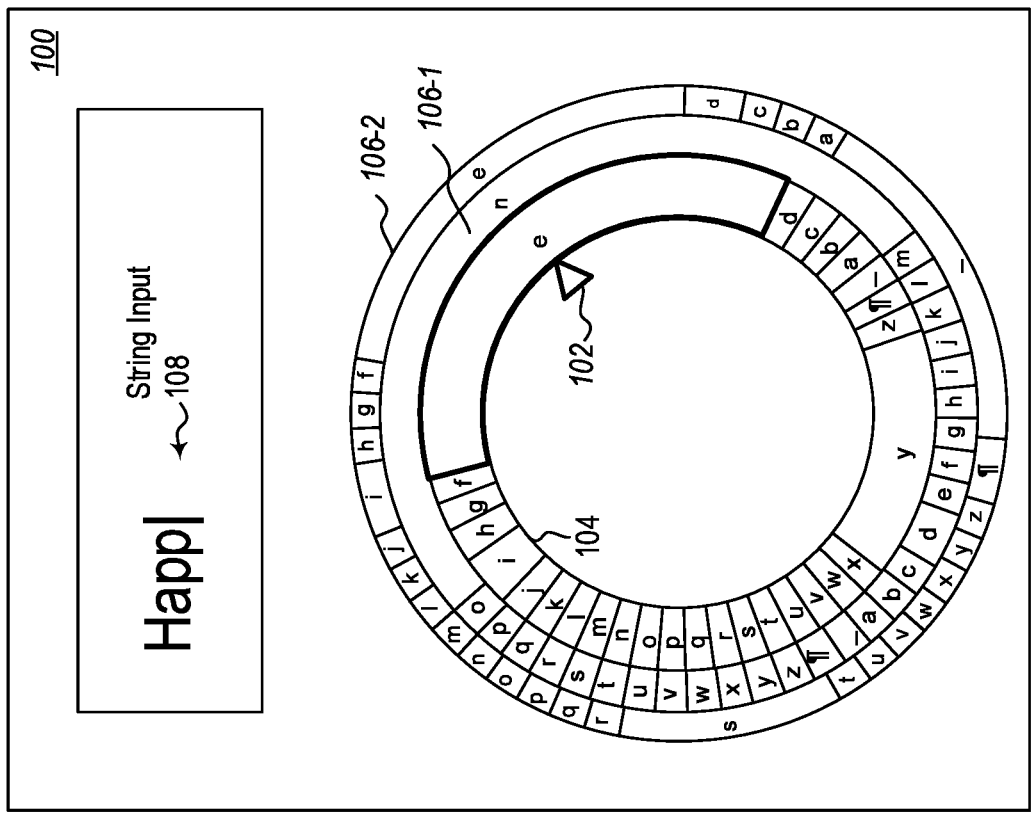
FIG. 1D illustrates the controller and user interface at a fourth time.
Figure 1D:
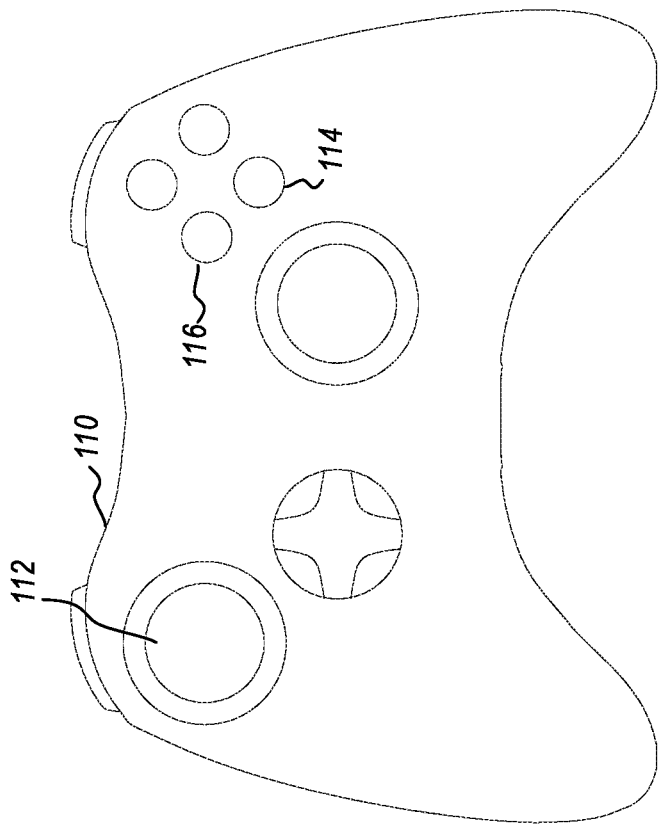

Note that as discussed above, in some embodiments, a rapid (where rapid is defined by some predetermined measure) series of selection signals will select a series of characters. For example, as illustrated in FIGS. 1C and 1D, the user can "double-tap" a selection signal (e.g., double click a button) causing 'pp' to be selected and added to the string input 108. The double selection will cause the characters being indicated (e.g., characters being pointed to by a cursor or characters in a particular position) to be selected for addition to the string input 108.

In some embodiments, characters can also be deleted from the string input 108. In some embodiments, the latest selected characters can be deleted by another selection signal. For example, on a controller 110, the X button 116, or the left trigger could be reserved for deleting characters from the string input 108. In some embodiments, this may be performed by a backspace cursor movement. Alternatively or additionally, a delete movement may be performed. In some embodiments, each layer will be replaced by their most-close-inner layer, and the entry layer will be recovered from the last selection action.

For completeness, reference is made again to FIGS. 1A through 1F. FIGS. 1A through 1F illustrate various states of the user interface 100 as a user enters the string "Happy" into the string input 108. Particular attention should be given to the various prominence levels with which characters in the various levels are displayed in addition to the movement of the various layers with respect to each other.

Illustrating now the complete example, at FIG. 1A the string input 108 is blank. The user will rotate the thumbstick 112 to the letter 'h'. In the present example, the right trigger 116 is used to switch to a capitalization mode. Thus in the present example, the user will select the right trigger 116 followed by selecting the A button 114 causing the capital letter 'H' to be entered into the string input 108 as illustrated in FIG. 1B.

Entering the letter 'H' into the string input 108 causes the various layers to rotate where the next predicted character in the entry layer 104 is the letter 'A'. Note that other characters are adjusted in the level of prominence displayed for the characters based on the indication of the letter at 'A' and the previous selection of the letter 'H'. Thus, as can be shown in the illustrated example shown in FIG. 1B, a triple tap of the A button 114 would cause the word "HAND" to be entered into the string input 108. However, in the present example, the user again presses the right trigger 116 causing lower-case letters to be displayed to the user and selects the A button 114 resulting in the letter 'a' being entered into the string input 108 as illustrated in FIG. 1C.

Figure 1E:
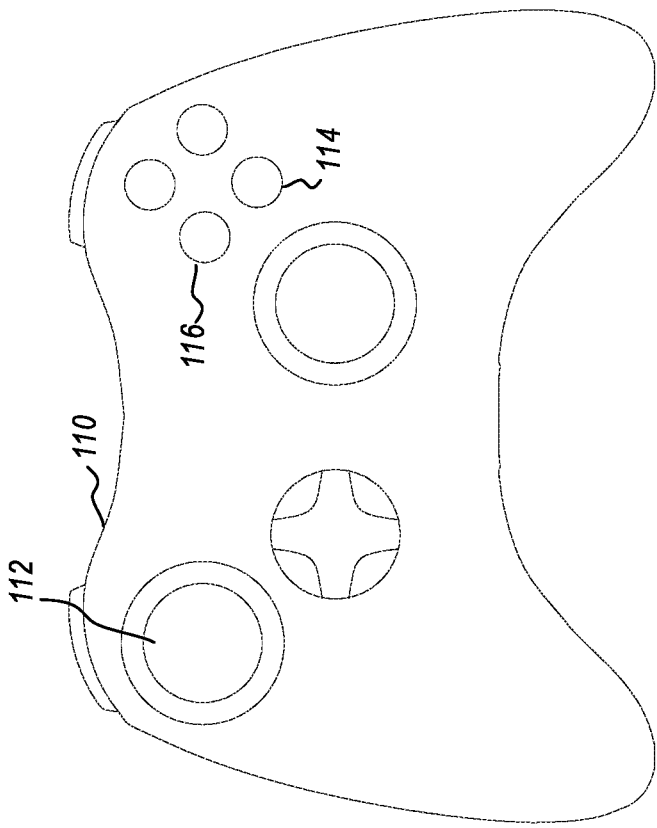
FIG. 1E illustrates the controller and user interface at a fifth time.
Figure 1E:
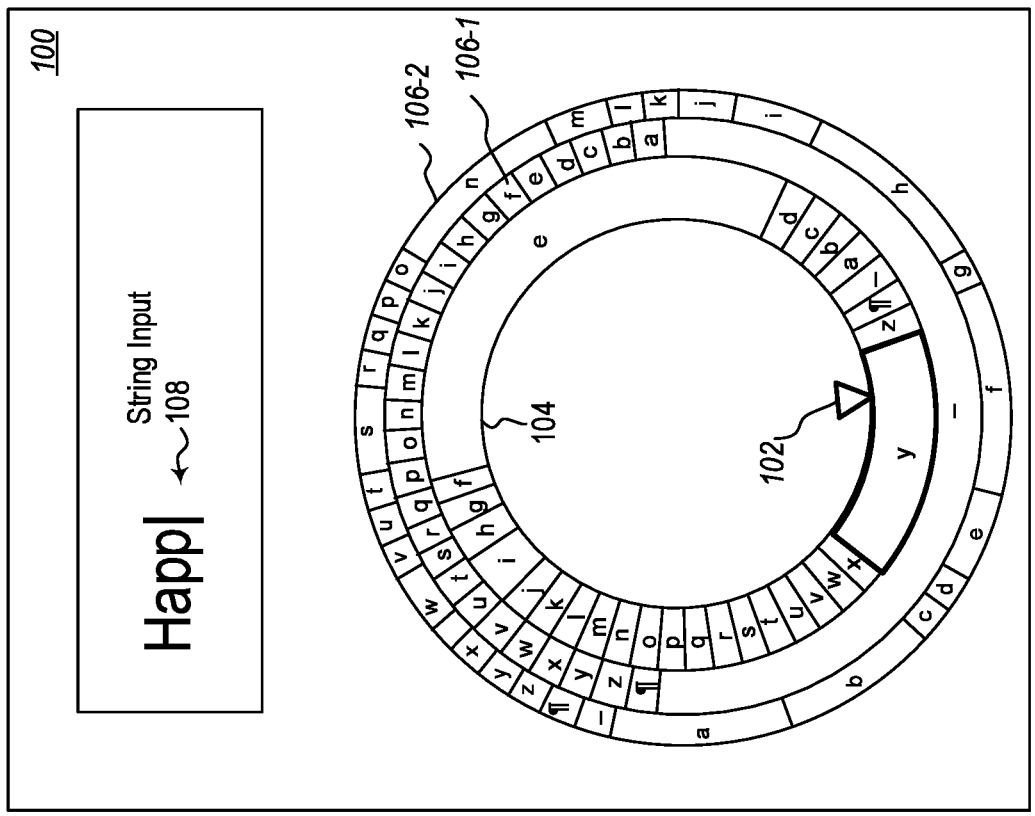
Figure 1F:
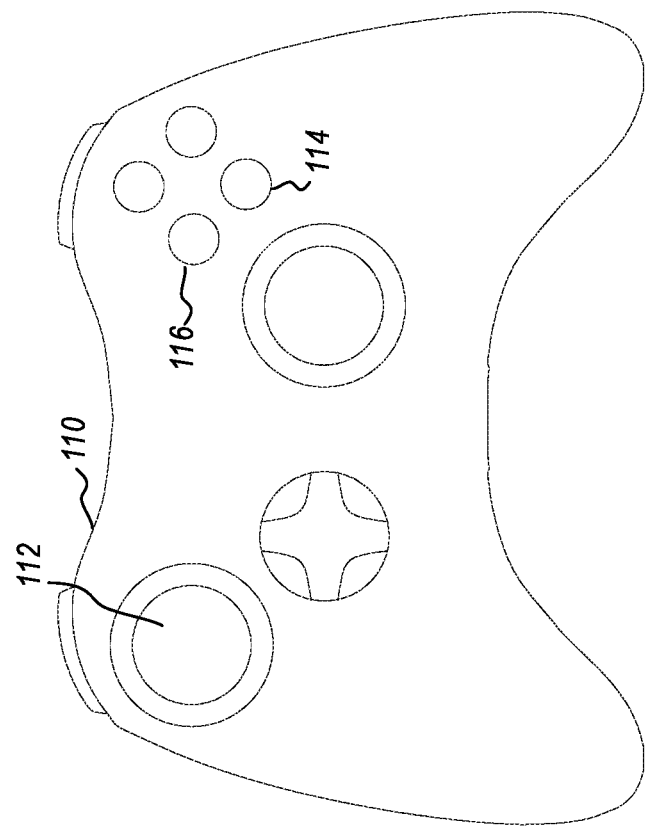
FIG. 1F illustrates the controller and user interface at a sixth time.
Figure 1F:
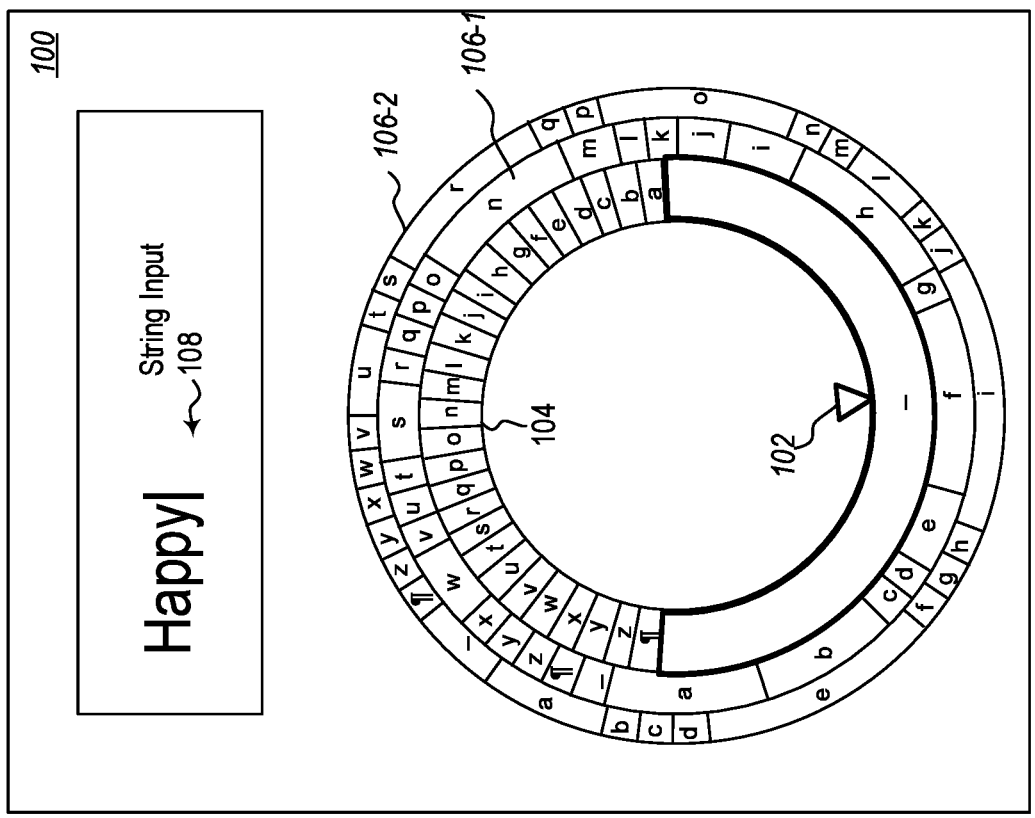

At this point, the user rotates the thumbstick 112 to indicate the letter 'p' in the entry layer 104 by pointing the cursor 102 at the letter 'p' in the entry layer 104. At this point the user double taps the A button 114 resulting in the letter 'p' from the entry layer 104 being entered into the string input 108 along with the letter 'p' from the first predictive layer 106-1 being entered into the string input 108, as illustrated in FIG. 1D. The user will then again rotate the thumbstick 112, as the cursor 102 is pointed at the letter E due two predictive actions rather than the desired letter 'y'. Thus the user rotates the thumbstick 112 to the letter 'y' as illustrated in FIG. 1E and selects the A button 114 causing the letter 'y' to be entered into the string input 108 as illustrated in FIG. 1F.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
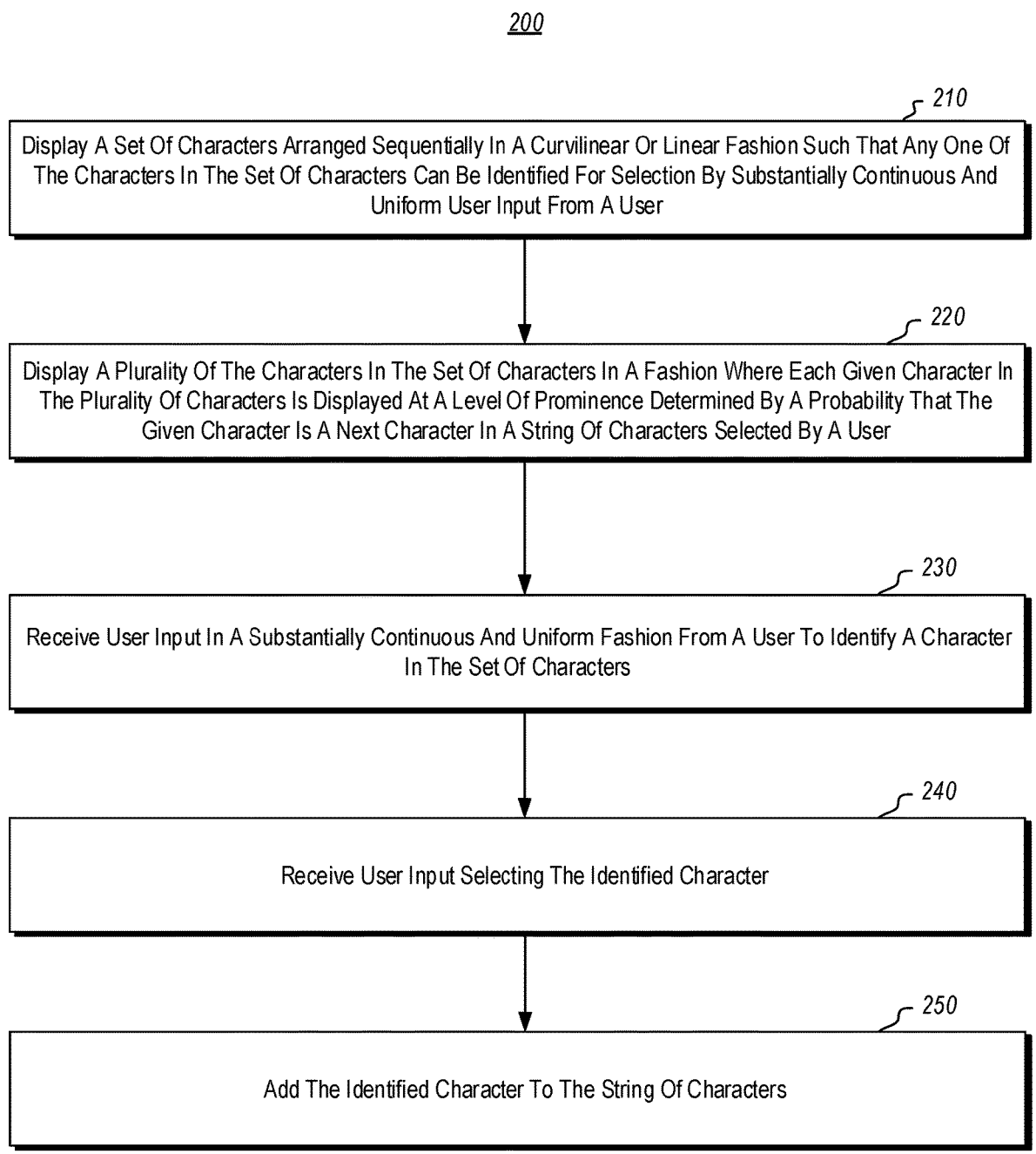
FIG. 2 illustrates a method of receiving user input.

Referring now to FIG. 2, a method 200 is illustrated. The method 200 includes acts for receiving user input. The method includes displaying a set of characters arranged sequentially in a curvilinear or linear fashion such that any one of the characters in the set of characters can be identified for selection by substantially sustained and uniform user input from a user (act 210). For example, reference is made to FIG. 1A which illustrates an entry layer 104 displayed on a user interface 100 in a circular fashion. However, the entry layer may alternatively or additionally be displayed as a different type of ellipse, a rectangle, a line, an arc, or other shape suitable for sequential display of characters. The entry layer 104 has a series of characters displayed sequentially thereon. A user can perform some sustained and uniform action to identify a character. For example, uniform input may be uniform in at least one of direction, speed, amplitude, motion pattern, radius, or other characteristic. The input can be sustained until a particular user desired character is indicated (such as by a cursor, highlighting, screen position, or other indication means).

The method 200 further includes displaying a plurality of the characters in the set of characters in a fashion where each given character in the plurality of characters is displayed at a level of prominence determined by a probability that the given character is a next character in a string of characters selected by a user (act 220). For example, as illustrated in FIG. 1B, based on the previous selection of 'H' in the string input 108, the characters in the entry layer 104 are displayed with arc lengths dependent on their probability of being a next character in the string input 108.

The method 200 further includes receiving user input in a substantially continuous and uniform fashion from a user to identify a character in the set of characters (act 230). For example, in the illustrated example, a user may rotate a thumbstick 112 of a controller 110 at an extreme radius allowable by the thumbstick 112 continuously until a cursor 104 identifies a character in the entry layer 104. As noted previously, in other embodiments, the user input may be via gaze, gesture, voice, or other input. Additionally or alternatively, identification of a character may be based on screen position, layer position, layer and/or character orientation, or other factors.

The method 200 further includes receiving user input selecting the identified character (act 240). For example, such input may be a button press on a controller, a trigger pull on a controller, a hand gesture, voice command, or other suitable input.

The method 200 further includes adding the identified character to the string of characters (act 250). For example, as illustrated in FIGS. 1A through 1F, characters can be added to the string input 108.

The method 200 may be performed where the set of characters is displayed in a substantially elliptical fashion. In the examples illustrated herein, the characters are arranged in a circular ellipse.

The method 200 may be performed where the set of characters is displayed in a substantially rectangular fashion. For example, the characters may be arranged in a square or other rectangle.

The method 200 may be performed where the set of characters is displayed in a partially elliptical fashion along an arc. For example, rather than using a full ellipse as shown, embodiments may use only a partial ellipse or other arc.

The method 200 may be performed where displaying the set of characters arranged sequentially in a curvilinear or linear fashion is performed by displaying the set of characters in a first layer. For example, FIG. 1A illustrates the first layer as the entry layer 104. The method 200 may further include displaying the set of characters in each of one or more other adjacently ordered layers. For example, the predictive layers 106-1 and 106-2 illustrate examples of adjacent layers. In some such embodiments, a layered character in each of the layers is displayed in proximity to another layered character in another layer based on a probability that the layered characters are likely to be adjacent to each other in the string of characters. For example, as illustrated in FIG. 1B, the letter 'n' is adjacent the letter 'a' and the letter 'd' is adjacent the letter 'a' based on probabilities.

In some such embodiments, the method 200 may further include receiving a rapid series of substantially similar user inputs, such as button presses, trigger pulls, gestures, eye movements, spoken cues, etc.), and as a result, adding the layered characters in the adjacently ordered layers to the string of characters. An example of this is illustrated by FIGS. 1C and 1D where 'pp' is added by a double tap of a controller button.

The method 200 may be performed where displaying the set of characters arranged sequentially in a curvilinear or linear fashion is performed by displaying the set of characters in conjunction with a color spectrum such that at least two different characters are associated with two different colors. For example, a color spectrum may be from shades of red to shades of green. The character 'a' may be displayed more in conjunction with the most red color, while the character 'z' may be displayed more in conjunction with the most green color.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable media having stored thereon instructions that are executable by the one or more processors to configure the computer system to receive user input, including instructions that are executable to configure the computer system to perform at least the following:
   displaying a set of characters arranged sequentially in a curvilinear or linear fashion where at least one of the characters in the set of characters is identified for selection by continuous and uniform user input from a user;
   displaying a plurality of the characters in the set of characters in a fashion where each given character in the plurality of the characters is displayed at a level of prominence determined by a probability that the given character is a next character in a string of characters selected by a user;
   receiving user input in a continuous and uniform fashion from a user to identify a character in the set of characters, wherein the character is identified by the user input causing a separate cursor user interface element to point at the identified character;
   receiving user input selecting the identified character;
   adding the identified character to the string of characters;
   wherein displaying the set of characters arranged sequentially in a curvilinear or linear fashion comprises displaying the set of characters in a first layer, wherein the one or more computer-readable media further have stored thereon instructions that are executable by the one or more processors to configure the computer system to display the set of characters in each of one or more other adjacently ordered layers where a layered character in each of the layers is displayed in adjacent proximity to another layered character in another layer based on probabilities that layered characters are likely to be adjacent to one another in the string of characters, and wherein the user input causes the layers to move in relation to each other and causes the separate cursor user interface element to point to the identified character and one or more layered characters in other layers based on a probability that characters including the identified character and the one or more layered characters are likely to be adjacent to one another in the string of characters.

2. The computer system of claim 1, wherein displaying a set of characters arranged sequentially in a curvilinear or linear fashion comprises displaying the set of characters in an elliptical fashion.

3. The computer system of claim 1, wherein displaying a set of characters arranged sequentially in a curvilinear or linear fashion comprises displaying the set of characters in a rectangular fashion.

4. The computer system of claim 1, wherein displaying a set of characters arranged sequentially in a curvilinear or linear fashion comprises displaying the set of characters in a partially elliptical fashion along an arc.

5. The computer system of claim 1, wherein the one or more computer-readable media further have stored thereon instructions that are executable by the one or more processors to configure the computer system to perform at least the following:
receiving a series of similar user inputs; and
as a result, adding the layered characters in the adjacently ordered layers to the string of characters.

6. The computer system of claim 1, wherein displaying the set of characters arranged sequentially in a curvilinear or linear fashion is performed by displaying the set of characters in conjunction with a color spectrum where at least two different characters are associated with two different colors.

7. A computing system comprising:
a screen comprising a user interface displaying a set of characters arranged sequentially in a curvilinear or linear fashion where at least one of the characters in the set of characters is identified for selection by continuous and uniform user input from a user and to display a plurality of the characters in the set of characters in a fashion where each given character in the plurality of the characters is displayed at a level of prominence determined by a probability that the given character is a next character in a string of characters selected by a user;
a user input device that receives user input in a continuous and uniform fashion from a user to identify a character in the set of characters, wherein the character is identified by the user input causing a separate cursor user interface element to point at the identified character, and receives user input indicating that identified characters are to be added to the string of characters in the user interface;
wherein the user interface displays the set of characters in a first layer, and displays the set of characters in each of one or more other adjacently ordered layers where a layered character in each of the layers is displayed in adjacent proximity to another layered character in another layer based on probabilities that layered characters are likely to be adjacent to one another in the string of characters, and wherein the user input causes the layers to move in relation to each other and causes the separate cursor user interface element to point to the identified character and one or more layered characters in other layers based on a probability that characters including the identified character and the one or more layered characters are likely to be adjacent to one another in the string of characters.

8. The computing system of claim 7, wherein the user input device comprises a gamepad comprising a thumbstick, and wherein the thumbstick receives user input in a continuous and uniform fashion from the user to identify the character in the set of characters.

9. The computing system of claim 7, wherein the user input device comprises a facial sensing system that receives user gaze input.

10. The computing system of claim 7, wherein the user input device comprises a gesture sensing system that receives user gesture input.

11. The computing system of claim 7, wherein the user interface displays the set of characters in an elliptical fashion.

12. A method of receiving user input, the method comprising:
displaying a set of characters arranged sequentially in a curvilinear or linear fashion where at least one of the characters in the set of characters is identified for selection by continuous and uniform user input from a user;
displaying a plurality of the characters in the set of characters in a fashion where each given character in the plurality of the characters is displayed at a level of prominence determined by a probability that the given character is a next character in a string of characters selected by a user;
receiving user input in a continuous and uniform fashion from a user to identify a character in the set of characters, wherein the character is identified by the user input causing a separate cursor user interface element to point at the character;
receiving user input selecting the identified character;
adding the identified character to the string of characters; and
wherein displaying the set of characters arranged sequentially in a curvilinear or linear fashion comprises displaying the set of characters in a first layer, wherein one or more computer-readable media further have stored thereon instructions that are executable by one or more processors to configure a computer system to display the set of characters in each of one or more other adjacently ordered layers where a layered character in each of the layers is displayed in adjacent proximity to another layered character in another layer based on probabilities that layered characters are likely to be adjacent to one another in the string of characters, and wherein the user input causes the layers to move in relation to each other and causes the separate cursor user interface element to point to the identified character and one or more layered characters in other layers based on a probability that characters including the identified character and the one or more layered characters are likely to be adjacent to one another in the string of characters.

13. The method of claim 12, wherein the set of characters is displayed in an elliptical fashion.

14. The method of claim 12, wherein the set of characters is displayed in a rectangular fashion.

15. The method of claim 12, wherein the set of characters is displayed in a partially elliptical fashion along an arc.

16. The method of claim 12, further comprising:
receiving a series of similar user inputs; and
as a result, adding the layered characters in the adjacently ordered layers to the string of characters.

17. The method of claim 12, wherein displaying the set of characters arranged sequentially in a curvilinear or linear fashion is performed by displaying the set of characters in conjunction with a color spectrum where at least two different characters are associated with two different colors.

18. The computer system of claim 1, wherein each of the characters in the set of characters is displayed in a different arc of an ellipse and wherein the cursor points to a center point of a longest arc.

19. The computing system of claim 7, wherein the user interface displays each of the characters in the set of characters in a different arc of an ellipse and wherein the cursor points to a center point of a longest arc.

20. The method of claim 12, wherein each of the characters in the set of characters is displayed in a different arc of an ellipse and wherein the cursor points to a center point of a longest arc.

* * * * *